No. 808,025.  
J. A. DOWNS.  
SAFETY HOLDBACK.  
APPLICATION FILED JUNE 17, 1905.  
PATENTED DEC. 19, 1905.
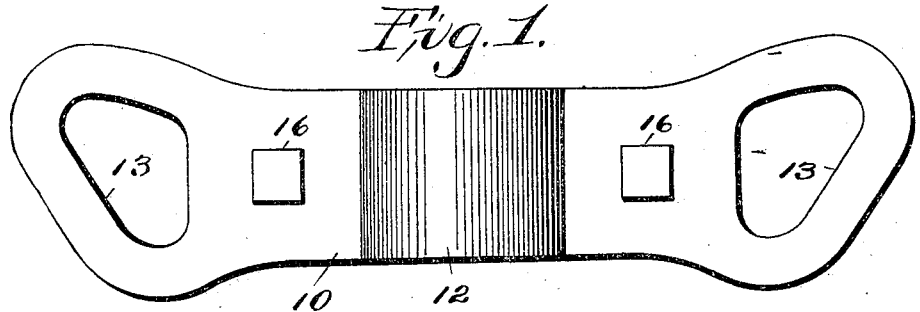
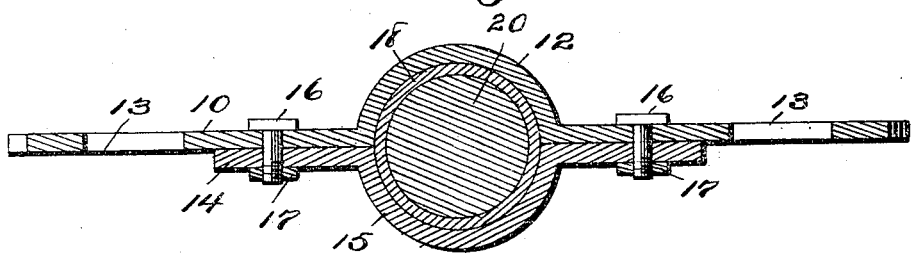
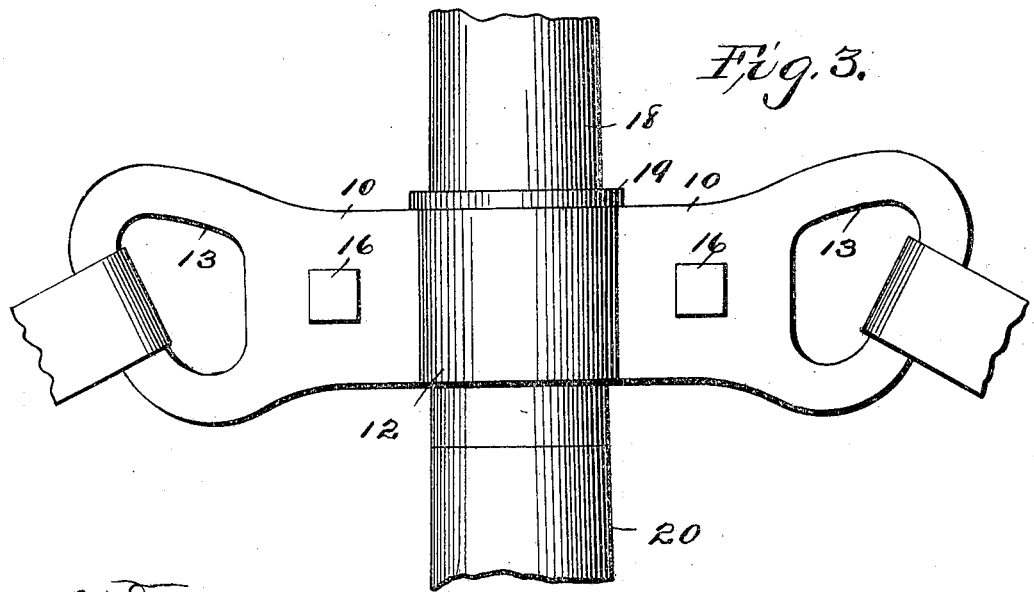

UNITED STATES PATENT OFFICE.

JOSHUA A. DOWNS, OF GLIDDEN, IOWA.

SAFETY-HOLDBACK.

No. 808,025.  Specification of Letters Patent.  Patented Dec. 19, 1905.

Application filed June 17, 1905. Serial No. 265,810.

*To all whom it may concern:*

Be it known that I, JOSHUA A. DOWNS, a citizen of the United States, residing at Glidden, in the county of Carroll and State of Iowa, have invented a new and useful Holdback Attachment for Carriage-Poles, of which the following is a specification.

My object is to provide improved means to prevent the dangers and accidents and loss of life and property incident to neck-yokes becoming detached from carriage-poles.

My invention consists in the construction, arrangement, and combination of an auxiliary safety device with a carriage-pole, as hereinafter set forth, pointed out in my claims, and illustrated in the accompanying drawings, in which—

Figure 1 is a top view of my pole attachment. Fig. 2 is a longitudinal sectional view of Fig. 1 and shows the forms and positions of the different parts of the device relative to each other and pole with which they are detachably connected. Fig. 3 is a top view that shows a section of the pole and my device applied thereto as required in practical use.

The numeral 10 designates the main part of the device in the form of a flat metal bar 10, that has a semicircular upward bend 12 at its center and integral links 13 at its ends, adapted for connecting leather straps therewith for connecting the device with collars on horses in any suitable way. A shorter metal bar 14 has a semicircular downward bend 15, and the two bars are adjustably and detachably connected by screw-bolts 16, passed through coinciding bolt-holes, and nuts 17 on the ends of the bolts, as shown in Fig. 2.

A metal pole tip or ferrule 18, having a flange 19 at its front end adapted in size to be placed on the front end portion of a pole 20, is fitted in the circular opening between the two bars 10 and 14, so that the ferrule and bars can be clamped together tightly by means of the bolts and nuts and then jointly placed on poles of different size.

Having thus set forth the purpose of my invention and its construction and application, its practical operation and utility will be readidly understood by persons familiar with the art to which it pertains. It will also be obvious that as an auxiliary device it alone constitutes a safe connection between a pole and collars on horses when a neck-yoke center and yoke on the front end of a pole are accidentally broken or in any way disconnected from the pole or collars on horses.

What I claim as new, and desire to secure by Letters Patent, is—

1. In a holdback attachment for carriage-poles, a flat metal bar having a semicircular upward bend at its center and integral links at its ends, and a shorter flat bar having a downward circular bend, coinciding bolt-holes in the two bars and the bars adjustably connected by bolts and nuts.

2. In a holdback attachment for carriage-poles, a flat metal bar having a semicircular upward bend at its center and integral links at its ends and a shorter flat bar having a downward circular bend, coinciding bolt-holes in the two bars and the bars adjustably connected by bolts and nuts and a ferrule having a flange at its front end fitted and fixed on the front ends of a pole.

3. In a holdback attachment for carriage-poles, a flat metal bar having a semicircular upward bend at its center and integral links at its ends and a shorter flat bar having a downward circular bend at its center coinciding bolt-holes in the two bars and the bars adjustably connected by bolts and nuts and a ferrule having a flange fitted and fixed on the front end of the pole and the bars and leather straps connected with the links on the ends of the upper bar and adapted to be detachably connected with collars on horses.

4. A holdback attachment for carriage-poles comprising a flat metal bar having a semicircular upward bend at its center and integral links at its ends and a shorter flat bar having a downward circular bend at its center coinciding bolt-holes in the two bars and the bars adjustably connected by bolts and nuts, a ferrule having a flange fitted and fixed on the front of the pole and leather straps connected with the links on the ends of the upper bar and adapted to be detachably connected with collars on horses, in combination with a carriage-pole, for the purposes stated.

J. A. DOWNS.

Witnesses:
J. CODER,
HENRY CLIFFORD.